| United States Patent [19] | [11] Patent Number: 4,984,755 |
|---|---|
| Derrien | [45] Date of Patent: Jan. 15, 1991 |

[54] AIRCRAFT LANDING GEAR HAVING WHEELS THAT SWIVEL WHILE THE LANDING GEAR IS BEING RETRACTED

[75] Inventor: Michel Derrien, Versailles, France

[73] Assignee: Messier-Hispano-Bugatti, Montrouge, France

[21] Appl. No.: 482,815

[22] Filed: Feb. 21, 1990

[30] Foreign Application Priority Data

Feb. 28, 1989 [FR] France .................... 89 02566

[51] Int. Cl.⁵ ............................................... B64C 25/10
[52] U.S. Cl. .......................... 244/102 SS; 244/102 A
[58] Field of Search ......... 244/102 R, 102 SS, 102 A, 244/104 R

[56] References Cited

U.S. PATENT DOCUMENTS 3,086,733  4/1963  Hartel .......................... 244/102 R
4,147,316  4/1979  Kendell et al. ................. 244/102 R
4,556,179  3/1985  Veaux ........................... 244/102 R
4,586,682  5/1986  Veaux et al. ................... 244/102 R

*Primary Examiner*—Joseph F. Peters, Jr.
*Assistant Examiner*—Virna Lissi Mojica
*Attorney, Agent, or Firm*—Sixbey, Friedman, Leedom & Ferguson

[57] ABSTRACT

The landing gear of the invention comprises a strut in which a sliding rod slides, the strut and the sliding rod are connected to each other by a scissors linkage having a top branch and a bottom branch which are connected to each other by articulated means capable of moving between a folded position in which the branches of the scissors linkage are adjacent to each other, and an unfolded position in which the branches of the scissors linkage are moved apart from each other, thereby causing the sliding rod to pivot about its own axis.

8 Claims, 2 Drawing Sheets

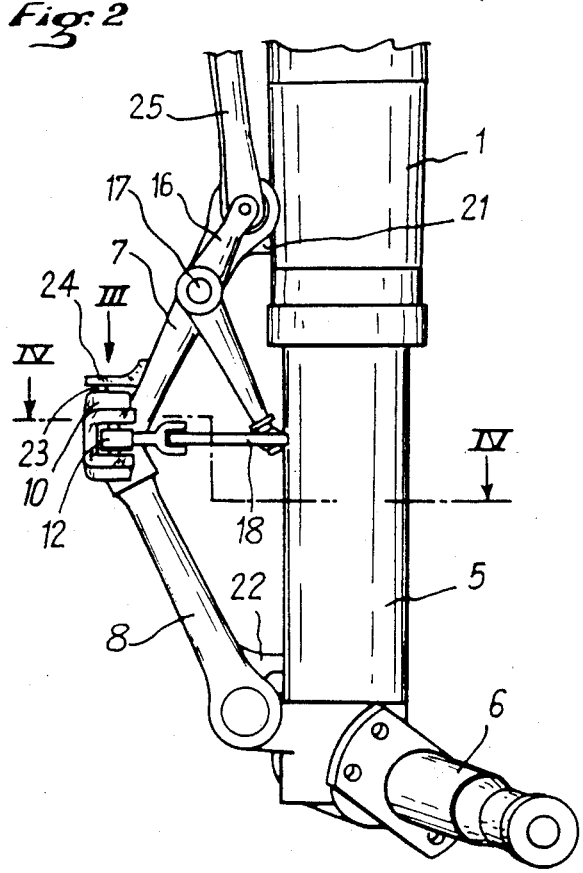
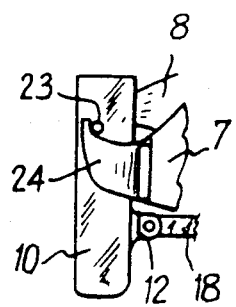
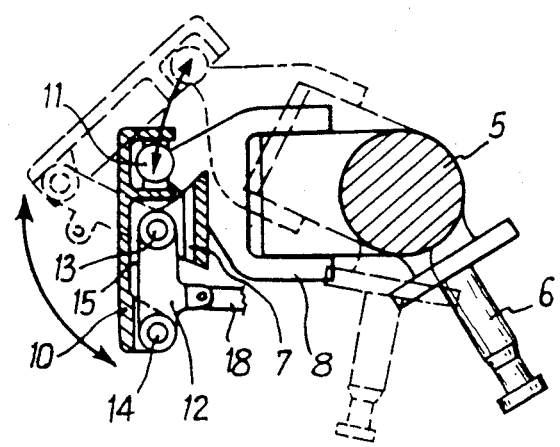

AIRCRAFT LANDING GEAR HAVING WHEELS THAT SWIVEL WHILE THE LANDING GEAR IS BEING RETRACTED

The present invention relates to retractable aircraft landing gear.

BACKGROUND OF THE INVENTION

In order to optimize the shape of the housing in an aircraft for its landing gear, it is sometimes necessary for the bottom portion of the landing gear to rotate relative to its top portion while the landing gear is being retracted. This function is generally performed by means of a rotary tube interposed between the landing gear strut which is hinged to the structure of the aircraft and a sliding rod mounted to slide in the strut and serving to support the wheels.

When the landing gear is in its working position, the rotary tube is locked relative to the strut and the wheels are held at a constant orientation by means of a scissors linkage having a top branch hinged to the rotary tube and a bottom branch hinged to the sliding rod. Rotary tube devices that operate satisfactorily do exist. However, the rotary tube increases the weight of the landing gear by a non-negligible extent and thus constitutes a handicap.

An object of the present invention is to provide landing gear including means for swivelling the wheels while the landing gear is being retracted, while nevertheless being lighter in structure than existing landing gear.

SUMMARY OF THE INVENTION

In order to achieve this object, the present invention provides retractable aircraft landing gear comprising a strut fitted with means for pivoting it to the structure of an aircraft, means for raising the strut, a sliding rod mounted to slide within the strut and supporting a wheel axle, and a scissors linkage comprising a top branch having a top end pivoted to the strut and a bottom branch having a bottom end pivoted to the sliding rod, the landing gear further including articulated means having one end pivoted to a bottom end of the top branch of the scissors linkage, and an opposite end pivoted to a top end of the bottom branch of the scissors linkage, and control means for controlling the articulated means to move between a folded position in which the bottom end of the top branch of the scissors linkage and the top end of the bottom branch of the linkage are adjacent, and an unfolded position in which the bottom end of the top branch of the scissors linkage and the top end of the bottom branch of the linkage are spaced apart from each other.

Thus, by operating the articulated means, the bottom end of the top branch of the scissors linkage and the top end of the bottom branch of the scissors linkage are moved towards and away from each other, thereby exerting torque on the sliding rod thus changing its orientation and the orientation of the wheels associated therewith, without it being necessary to provide a rotary tube between the strut and the sliding rod.

In an advantageous version of the invention, the articulated means comprise an articulated link having a first end connected to the top end of the bottom branch of the scissors linkage, and an articulated lever having a first end connected to the bottom end of the top branch of the linkage, the link and the lever having second ends which are connected to each other, and the control means being associated in hinged manner with the lever.

Preferably, the control means comprise a crank pivotally mounted on the top branch of the scissors linkage and having a first end connected to the lever via a tie link and a second end connected to a resilient telescopic link, said resilient link being fitted with means for fixing it to the structure of the aircraft and disposed in such a manner as to keep the resilient link in traction when the landing gear is extended, and to put it into compression when the landing gear is retracted. Thus, while the landing gear is being retracted, the compression applicable to the telescopic link pivots the crank which in turn pushes back the articulated lever in order to unfold the articulated means.

In a preferred embodiment of the invention, the crank is connected to the telescopic link by a pivot which is coaxial with the pivot axis between the top strut and the top end of the top branch of the scissors linkage. Thus, the crank remains neutral relative to the articulated means during landing and while the aircraft is running on the ground.

In another preferred aspect of the invention, the articulated link includes a cavity in which the pivot between the articulated lever and the top branch of the scissors linkage is received when the link and the lever are in a folded position such that said pivot and the pivots between the link and the lever and between the link and the bottom branch of the scissors linkage are in side-by-side alignment. Thus, the link and the lever remain in the folded position in stable manner.

BRIEF DESCRIPTION OF THE DRAWINGS

An embodiment of the invention is described by way of example with reference to the accompanying drawings, in which:

FIG. 2 is a side view of a portion of the landing gear of the invention shown on a larger scale;

FIG. 3 is a fragmentary view seen looking along arrow III of FIG. 2; and

FIG. 4 is a fragmentary view in section on line IV—IV of FIG. 2.

DETAILED DESCRIPTION

Figure 1:
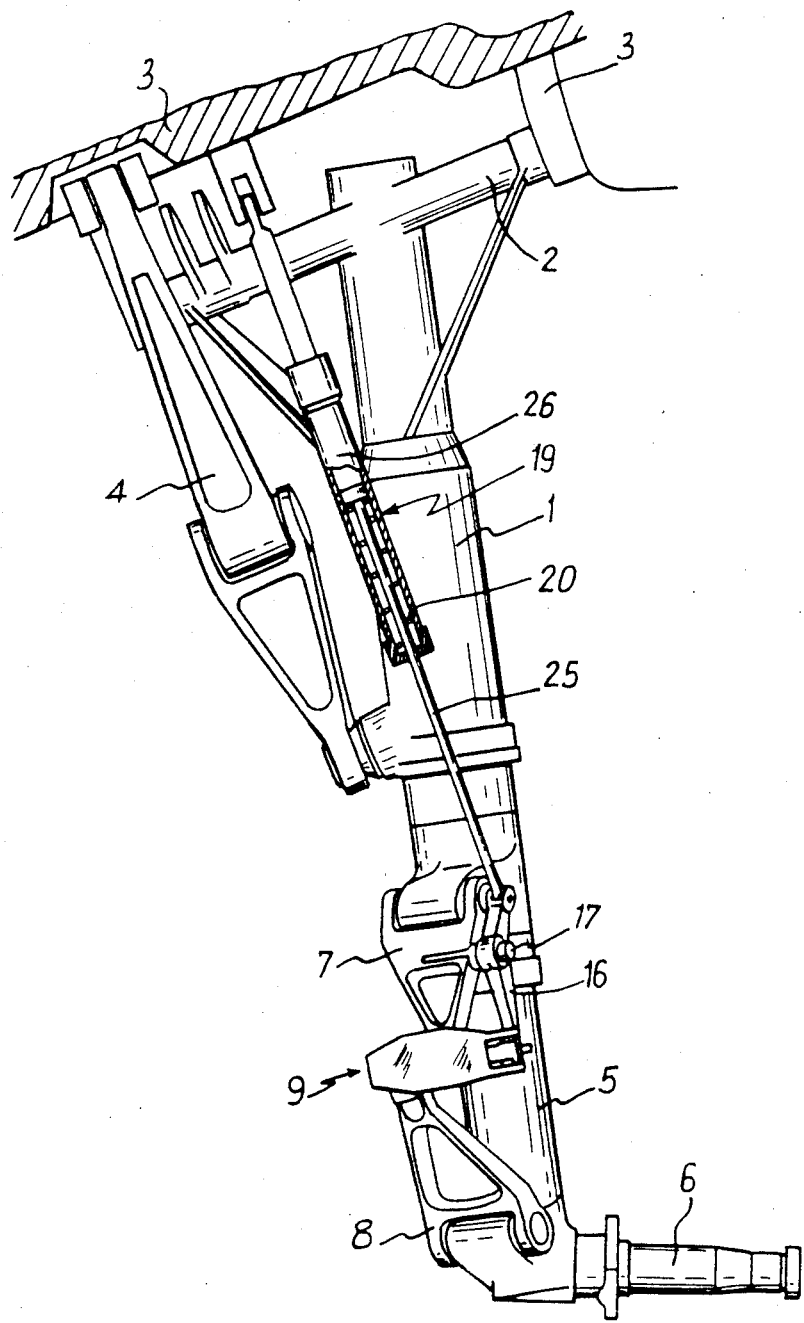
FIG. 1 is a perspective view, partially in section, of landing gear in accordance with the invention.

With reference to the figures, the landing gear of the invention includes, in conventional manner, a strut 1 hinged about a pivot 2 to the structure 3 of an aircraft. The strut 1 is also connected to the aircraft structure 3 by brace means 4 operated by a retracting actuator (not shown). In conventional manner, the landing gear also includes a sliding rod 5 mounted to slide in the strut 1 and supporting a wheel axle 6, and a scissors linkage comprising a top branch 7 having a top end pivotally fixed to the strut 1 and a bottom branch 8 having a bottom end pivotally fixed to the sliding rod 5, with both pivots being about horizontal axes.

In accordance with the invention, the top branch 7 of the scissors linkage and the bottom branch 8 thereof are not coupled to each other directly, but they are interconnected by articulated means given a general reference 9. In the preferred embodiment shown, the articulated means 9 comprise an articulated link 10 having a first end pivoted to the top end of the bottom branch 8 of the scissors linkage by a ball-and-socket connection 11, and an articulated lever 12 having a first end hinged to the bottom end of the top branch 7 of the scissors linkage about a pivot 13. The link 10 and the lever 12 have their respective second ends connected to each other so as to be articulated about a pivot 14. The link 10 includes a cavity 15 in which the lever 12 is received in the folded position such that when in this folded position (shown in solid lines in FIG. 4) the pivots 11, 13, and 14 are in side-by-side alignment.

The position of the articulated means 9 is determined by control means including a crank 16 pivotally mounted on a horizontal pivot 17 fixed to the top branch 7 of the scissors linkage, parallel to the pivot of the branch 7 on the strut. The bottom end of the crank 16 is connected via a ball-and-socket connection to a tie link 18 which is also pivoted to the lever 12. The top end of the crank 16 is pivoted to the rod 25 of a telescopic link 19 whose cylinder 26 is pivoted to the aircraft structure 3 at a point thereon which is offset from the axis about which the strut 1 is pivoted to the same structure. The telescopic link 19 also contains a resilient member, e.g. a spring 20 disposed to keep the resilient telescopic link in traction when the landing gear is extended. The pivot axis at the top end of the crank 16 with the telescopic link 19 is preferably coaxial with the pivot axis of the top end of the top branch 7 of the scissors linkage with the strut 1.

In the preferred embodiment shown, the top branch 7 of the scissors linkage also includes an abutment 21 which bears against the strut 1 when the landing gear is in its fully-extended position and the bottom branch 8 of the scissors linkage includes an abutment 22 which bears against the sliding rod 5 when the landing gear is in its fully-extended position. A locking stud 23 is also provided on the link 10 and is disposed appropriately thereon such that when the articulated link and lever are in their folded position, the stud comes into abutment against a locking cam 24 carried by the top branch 7 of the scissors linkage.

The landing gear of the invention operates as follows: when the landing gear is lowered into its working position, the telescopic link 19 is in traction and it urges the articulated link 10 and lever 12 towards their folded position in which they extend along a substantially horizontal direction and are locked by the stud 23 bearing against the cam 24. While the aircraft is landing or running on the ground, the top branch 7 of the scissors linkage can pivot about its pivot with the strut, and the bottom branch 8 of the linkage can pivot about its pivot axis with the sliding rod. The bottom end of the top branch 7 and the top end of the bottom branch 8 are held adjacent to each other and may pivot relative to each other about a horizontal axis by the articulated link 10 pivoting relative to the ball 11. During inwards and outwards sliding motion of the sliding rod 5, the crank 16 remains neutral relative to the top branch 7 of the scissors linkage. The link 10 and the lever 12 therefore remain in their folded position both because of the traction exerted by the telescopic link 19 and because of the locking effect due to the stud 23 and the cam 24.

When the aircraft is in flight, the abutment 21 of the top branch 7 of the scissors linkage bears against the strut 1 and the abutment 22 of the bottom branch 8 of the linkage bears against the sliding rod 5 such that the relative positions of the top and bottom branches of the scissors linkage are accurately defined. When the landing gear is raised, the articulated link 10 and lever 12 remain in the folded position so long as the telescopic link 19 is kept under traction by the spring 20. However, when the rod 25 of the telescopic link 19 reaches the end of the cylinder 26, the telescopic link 19 is put into compression and pushes back the top end of the crank 16. The crank 16 then pivots about its axis 17 and in turn pushes back the lever 12 which it forces to pivot, thereby unfolding the link 10 and the lever 12 and thus progressively moving the top end of the bottom branch 8 of the scissors linkage away from the bottom end of the top branch 7 thereof until the position shown in dashed lines in FIG. 4 is reached. As the top end of the bottom branch of the scissors linkage moves away from the bottom end of the top branch thereof, the sliding rod is caused to rotate, thereby altering the orientation of the wheel axle 6.

Naturally the invention is not limited to the embodiment described and variants may be made thereto without going beyond the scope of the invention. In particular, although the articulated link 10 completely surrounds the lever 12 when in the folded position in the embodiment shown, it would be possible to use a link 10 which is merely curved so that the lever 12 can b=received in the concave side of the link, acting as a "cavity". Similarly, although a ball-and-socket connection 11 is provided between the link and the top end of the bottom branch of the scissors linkage, the ball-and-socket connection could alternatively be placed between the bottom end of the top branch of the linkage and the end of the lever, or else a universal joint type coupling could be provided between the articulated means 9 and one or other of the branches of the linkage. The control mechanism including a crank and a telescopic link could be replaced by a hydraulic or pneumatic actuator having one end pivoted to the strut and having its other end hinged to the lever 12.

When a crank is used, its pivot may extend along an axis different from the pivot axis between the top branch 7 and the strut.

I claim:

1. Retractable aircraft landing gear comprising a strut fitted with means for pivoting it to the structure of an aircraft, means for raising the strut, a sliding rod mounted to slide within the strut and supporting a wheel axle, and a scissors linkage comprising a top branch having a top end pivoted to the strut and a bottom branch having a bottom end pivoted to the sliding rod, wherein the landing gear includes articulated means having one end pivoted to a bottom end of the top branch of the scissors linkage, and an opposite end pivoted to a top end of the bottom branch of the scissors linkage, and control means for controlling the articulated means to move between a folded position in which the bottom end of the top branch of the scissors linkage and the top end of the bottom branch of the linkage are adjacent, and an unfolded position in which the bottom end of the top branch of the scissors linkage and the top end of the bottom branch of the linkage are spaced apart from each other.

2. Aircraft landing gear according to claim 1, wherein the articulated means comprise an articulated link having a first end connected to the top end of the bottom branch of the scissors linkage, and an articulated lever having a first end connected to the bottom end of the top branch of the linkage, the link and the lever having second ends which are connected to each other, and the control means being associated in hinged manner with the lever.

3. Aircraft landing gear according to claim 2, wherein the control means comprise a crank pivotally mounted on the top branch of the scissors linkage and having a first end connected to the articulated lever via a tie link and a second end connected to a resilient telescopic link, said resilient link being fitted with means for fixing it to the structure of the aircraft and disposed in such a manner as to keep the resilient link in traction when the landing gear is extended, and to put it into compression when the landing gear is retracted.

4. Aircraft landing gear according to claim 3, wherein the crank is connected to the telescopic link by a pivot which is coaxial with the pivot axis between the top strut and the top end of the top branch of the scissors linkage.

5. Aircraft landing gear according to claim 2, wherein the articulated link includes a cavity in which the pivot between the lever and the top branch of the scissors linkage is received when the link and the lever are in a folded position such that said pivot and the pivots between the link and the lever and between the link and the bottom branch of the scissors linkage are in side-by-side alignment.

6. Aircraft landing gear according to claim 2, wherein the articulated link is connected to the bottom branch of the scissors linkage by a ball-and-socket connection.

7. Aircraft landing gear according to claim 6, wherein the articulated link includes a locking stud which, in the folded position of the link and the lever, comes into abutment against the locking cam carried by the top branch of the scissors linkage.

8. Aircraft landing gear according to claim 2, wherein the top branch and the bottom branch of the scissors linkage include abutments respectively making contact with the strut and with the sliding rod in the fully-extended position of the landing gear.

* * * * *